(12) United States Patent
Yoda et al.

(10) Patent No.: US 6,848,081 B1
(45) Date of Patent: Jan. 25, 2005

(54) INFORMATION PROCESSING SYSTEM AND METHOD FOR DISPLAYING AN OPERATION BUTTON

(75) Inventors: Nobuhisa Yoda, Kamakura (JP); Kazuaki Kidokoro, Yokohama (JP); Tatsuya Haraguchi, Yokohama (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 944 days.

(21) Appl. No.: 09/589,355

(22) Filed: Jun. 8, 2000

(30) Foreign Application Priority Data

Jun. 10, 1999 (JP) ............................................ 11-164027

(51) Int. Cl.⁷ ................................................ G06F 3/00
(52) U.S. Cl. ...................... 715/741; 715/743; 715/835; 715/771
(58) Field of Search ................................. 345/840, 741, 345/779, 748, 743, 835, 740, 771, 773; 709/318, 203

(56) References Cited

U.S. PATENT DOCUMENTS

| | | | | |
|---|---|---|---|---|
| 5,821,933 A | * | 10/1998 | Keller et al. ................. | 345/741 |
| 6,215,487 B1 | * | 4/2001 | Barrett et al. ................ | 345/840 |
| 6,370,521 B1 | * | 4/2002 | Pigos et al. .................... | 707/2 |
| 6,480,304 B1 | * | 11/2002 | Os et al. ...................... | 358/474 |
| 6,549,820 B1 | * | 4/2003 | Barrett et al. ................ | 700/110 |

* cited by examiner

Primary Examiner—John Cabeca
Assistant Examiner—Kieu D. Vu
(74) Attorney, Agent, or Firm—Foley & Lardner LLP (57) ABSTRACT

A user prepares a registration destination database, a title and field map information with respect to a transfer profile. The right of access to the database by the user is confirmed. A transfer profile is registered in a transfer profile setting section. Subsequently, an operation button function setting section of a digital scanner is activated, and a transfer profile name applied to an operation button is selected. A user name as a registrant, a format of attachment of a document image, an image format at a time of document registration are set. A display icon of the operation button and a button name are input, and the operation button is registered in an operation button management database.

4 Claims, 12 Drawing Sheets

| RELAY DOCUMENT # | PROFILE ID | SCAN DATE/TIME | USED SCREEN # /BUTTON # |
|---|---|---|---|
| 1 | 1001 | 1999-05-15 @ 10:15 | 1/1 |
| 2 | 3002 | 1999-05-15 @ 10:16 | 100/1 |
| 3 | 3001 | 1999-05-15 @ 10:25 | 500/1 |

FIG. 5

| SCREEN # | BUTTON # | TRANSFER DESTINATION SYSTEM | TITLE | SCAN ATTRIBUTE | USER | PROFILE ID | PASSWORD |
|---|---|---|---|---|---|---|---|
| 1 | 1 | FILING A | WEEKLY REPORT KATO | 200DPI BLACK-AND-WHITE | ALICE | 1001 | 1234 |
| 1 | 2 | FILING A | TECHNICAL INFORMATION | 200DPI COLOR | BOB | 1002 | 5555 |
| 2 | 1 | FILING B | WEEKLY REPORT | 600DPI BLACK-AND-WHITE | CATHY | 2001 | 1111 |
| 2 | 2 | FILING B | CATALOG INFORMATION | 600DPI COLOR | DAVID | 2002 | (NONE) |

FIG. 4

| RELAY DOCUMENT # | PROFILE ID | SCAN DATE/TIME | USED SCREEN #/BUTTON # | USER NAME | IMAGE ID |
|---|---|---|---|---|---|
| 1 | 1001 | 1999-05-15 @ 10:15 | 1/1 | ALICE | 1 |
| 2 | 1002 | 1999-05-15 @ 10:16 | 1/2 | BOB | 2 |
| 3 | 2001 | 1999-05-15 @ 10:25 | 2/2 | DAVID | 3 |

FIG. 6

| DOCUMENT # | DATE OF PREPARATION | REGISTRANT | TITLE | TEXT |
|---|---|---|---|---|
| 1 | 1999-5-15 @ 10:15 | ALICE | (CONFIDENTIAL) WEEKLY REPORT REGISTRATION KATO | 1999-05-15 (ATTACHED IMAGE) |

```
PROFILE ID=1001
TRANSFER DESTINATION DB=ACCOUNTING WEEKLY REPORT DATABASE
FIELD MAP:
      DATE OF PREPARATION=%DATE%
      REGISTRANT=%USER%
      TEXT=%DOCUMENT IMAGE%
      TITLE=(CONFIDENTIAL)%BUTTON NAME%%DATE%

DOCUMENT REGISTRATION FILE FORMAT:PASTE
MAIL NOTICE:    YES      foo@bar.co.jp
```

FIG. 9A

```
PROFILE ID=1002
TRANSFER DESTINATION DB=TECHNICAL INFORMATION DATABASE
FIELD MAP:
      DATE OF PREPARATION=%DATE%
      REGISTRANT=%USER%
      TECHNICAL LEVEL=HIGH
      CATEGORY=%BUTTON NAME%
      TEXT=%DOCUMENT IMAGE%
      TITLE=(IMPORTANT TECHNIQUE)%BUTTON NAME%%USER%

DOCUMENT REGISTRATION FILE FORMAT:FILE ATTACHED
MAIL NOTICE:    NO
```

INFORMATION PROCESSING SYSTEM AND METHOD FOR DISPLAYING AN OPERATION BUTTON

CROSS-REFERENCE TO RELATED APPLICATIONS

This application is based upon and claims the benefit of priority from the prior Japanese Patent Application No. 11-164027, filed Jun. 10, 1999, the entire contents of which are incorporated herein by reference.

BACKGROUND OF THE INVENTION

The present invention relates to an information process system and an information process method for, for example, a server system for document filing, etc., to which a digital scanner such as a digital copying machine, for example, is connected.

According to some kind of a conventional network scanner system, a read document image is automatically registered in a plurality of application systems.

However, in a network scanner system based on a digital copying machine, etc., there are limitations to operational environments because importance is placed on easy operations. For example, there are limitations to a character input environment such as keyboard, and to a display environment such as a display device. Document attributes (title information) which can be set on a document to be registered are limited and fixed. Owing to such limitations, it is necessary, for example, to install different software items on individual transfer destination systems, or to temporarily provide all users with the right of access to a read and automatically registered document. There has been a demand to improve these disadvantages in view of the management and handling of office documents.

In such limited operational environments, in order to enhance affinity between the transfer destination application system and the network scanner system and improve the handling of documents by the user, it is important to reflect the operational environment of the transfer destination application system on the operational environment of the network scanner system.

There are the following problems with the above-described prior art.

Since the input means in an input device of a digital copying machine is limited to numeral keys or the like, it is difficult to directly log in to the transfer destination system. Since the direct log-in is not permitted despite the digital copying machine being shared by a great number of non-specified users, the user cannot be specified in the transfer destination system.

Moreover, since users cannot be specified despite the digital copying machine being shared by the users, an input/registered document needs to be temporarily shared by all users and it is difficult to keep privacy of the read document.

When information on a destination system for document transfer registration is set as a definition of a button, it is difficult to set information dependent on the system. Where a document is transferred to a plurality of systems at a time, registration information management is complex.

In addition, when a document is transferred from a digital copying machine to another system, the digital copying machine has to perform its own time-consuming user management in order to keep correspondence to user management in the transfer destination system.

Where a document image scanned by the digital copying machine is directly stored in databases of transfer destination systems and an exclusive user for the digital copying machine is set and the document is automatically registered on a plurality of databases on the network under the authority of the user, the right of access to each database by the user needs to be set. There is a problem of security if the right of access to all databases is set by the user ID which is, in fact, shared by a great number of non-specified users.

As regards operation buttons on a conventional digital copying machine, metadata obtainable at the time of operations is limited, for example, to operation time, read setting value, etc. It is difficult to use such data in a title to be prepared when the document image is registered on the database. Furthermore, the means for associating such information items as attributes of the document registered in the transfer destination system is poor and difficult to handle.

BRIEF SUMMARY OF THE INVENTION

The object of the present invention is to provide an information process system and an information process method capable of easily processing information such as a document in an environment in which a shared input/output device is used in a network to which a digital scanner such as a digital copying machine is connected.

In order to achieve this object, according to an aspect of the present invention, there is provided an information process system in which an image forming apparatus having display input means capable of displaying various operation buttons and effecting input is connected to a communication line and information is processed with a server connected to the communication line, wherein the server has formation means for forming operation button information which sets a function to be performed by the image forming apparatus and is to be displayed on the display input means, and the image forming apparatus comprises:

registration means for registering the operation button information which sets the function to be performed by the image forming apparatus and has been formed by the formation means; and control means for executing a control to display an operation button on the display input means, on the basis of the operation button information which sets the function to be performed by the image forming apparatus and has been registered by the registration means.

According to another aspect of the invention, there is provided an information process system in which an image forming apparatus having display input means capable of displaying various operation buttons and effecting input is connected to a communication line and information is processed with a server connected to the communication line, wherein the server has formation means for forming operation button information which sets a function to be performed by the image forming apparatus and is to be displayed on the display input means, and information for verifying a right of use of an operation button represented by the operation button information and the image forming apparatus comprises:

registration means for registering the operation button information which sets the function to be performed by the image forming apparatus and has been formed by the formation means, and the information for verifying the right of use of the operation button, which has been formed by the formation means;

control means for executing a control to display the operation button on the display input means, on the basis of the operation button information which sets the function to be performed by the image forming apparatus and has been registered by the registration means;

verification means for verifying the presence/absence of the right of use by using the information for verifying the right of use of the operation button, which has been registered by the registration means, when input has been effected through the operation button displayed on the display input means by the control means; and execution means for executing a desired function set by the operation button through which input has been effected, when the presence of the right of use has been verified by the verification means.

According to still another aspect of the invention, there is provided an information process method in which an image forming apparatus having display input means capable of displaying various operation buttons and effecting input is connected to a communication line and information is processed with a server connected to the communication line, wherein the server forms operation button information which sets a function to be performed by the image forming apparatus and is to be displayed on the display input means, and the image forming apparatus registers the operation button information which sets the function to be performed by the image forming apparatus and has been formed by the server, and executes a control to display an operation button on the display input means, on the basis of the registered operation button information which sets the function.

According to still another aspect of the invention, there is provided an information process method in which an image forming apparatus having display input means capable of displaying various operation buttons and effecting input is connected to a communication line and information is processed with a server connected to the communication line, wherein the server forms operation button information which sets a function to be performed by the image forming apparatus and is to be displayed on the display input means, and information for verifying a right of use of an operation button represented by the operation button information and the image forming apparatus registers the operation button information which sets the function to be performed by the image forming apparatus and has been formed by the server, and the information for verifying the right of use of the operation button, which has been formed by the server; executes a control to display the operation button on the display input means, on the basis of the registered operation button information which sets the function; verifies the presence/absence of the right of use by using the registered information for verifying the right of use of the operation button, when input has been effected through the operation button displayed on the display input means by the control means; and executes a desired function set by the operation button when the presence of the right of use has been verified.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 1:
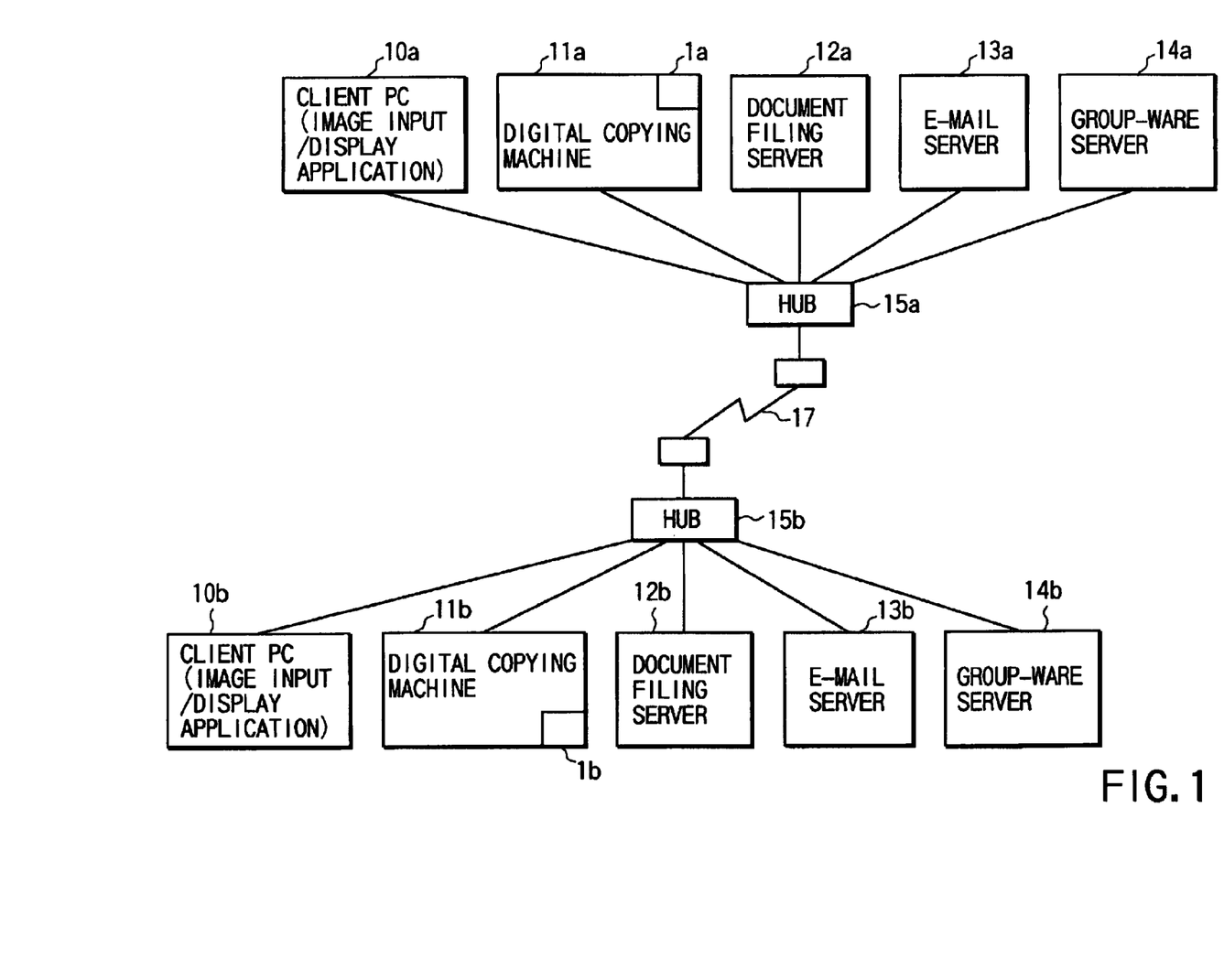
FIG. 1 is a block diagram showing a schematic structure of an information process system according to the present invention.

FIG. 1 is a block diagram showing a schematic structure of an information process system according to the present invention.

A client personal computer (PC) 10a, a digital copying machine 11a having an operation panel 1a, a document filing server 12a, an e-mail server 13a, and a group-ware server 14a are connected by a hub (HUB) 15a. A client personal computer (PC) 10b, a digital copying machine 11b having an operation panel 1b, a document filing server 12b, an e-mail server 13b, and a group-ware server 14b are connected by a hub (HUB) 15b. The hub 15a and hub 15b are connected by an intranet 17. The operation panel 1a, 1b incorporates a touch panel and it is operated through various buttons displayed on a liquid-crystal display.

The client PC 10a, 10b is used by a user. The client PC 10a, 10b displays a document (document image) or an e-mail.

The digital copying machine 11a, 11b is used to copy paper documents. In addition, it prints out a digital document image on paper media. The digital copying machine 11a, 11b is also used as a scanner for inputting paper media documents.

The document filing server 12a, 12b manages documents.

The e-mail server 13a, 13b manages transmission/reception of e-mails.

The group-ware server 14a, 14b provides an electronic bulletin board or a schedule management environment.

Figure 2:
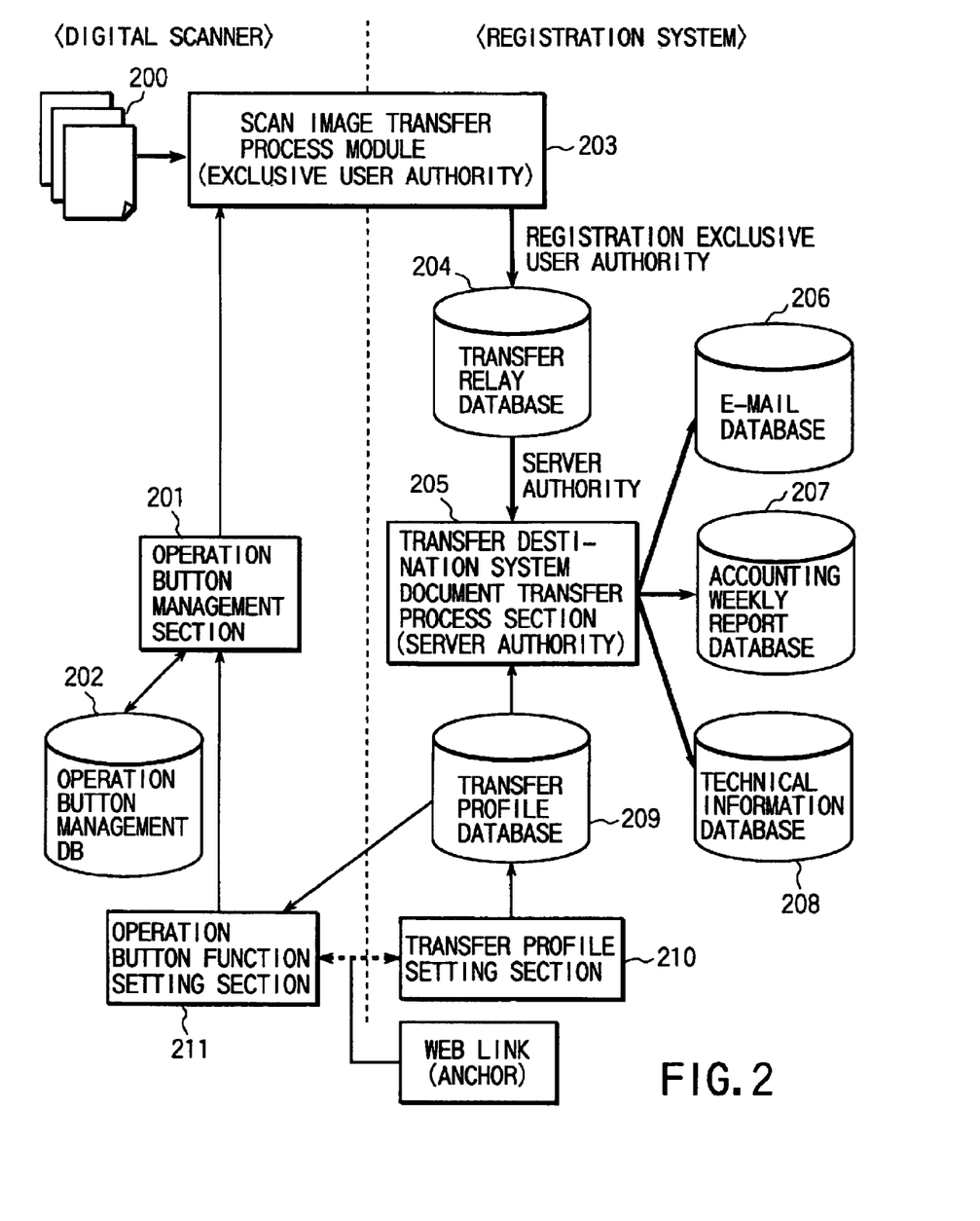
FIG. 2 shows a system module structure according a first embodiment of the present invention.

FIG. 2 shows a system module structure according a first embodiment of the present invention.

On the digital scanner side, the following components are provided: a document image 200 input by the digital copying machine 11a, 11b serving as a digital scanner; an operation button management section 201, provided in each digital copying machine 11a, 11b, for performing a display control of operation buttons displayed on the operation panel 1a, 1b of the digital copying machine 11a, 11b; an operation button management database (DB) 202, provided in each digital copying machine 11a, 11b, for managing display on the operation panel 1a, 1b; and a scan image transfer process module 203 for transferring the document image 200 to a transfer relay database 204 of a registration destination system, when the operator has depressed the buttons on the operation panel 1a, 1b and has input the document image 200.

The registration destination system is, for example, the client PC 10a, 10b, the document filing server 12a, 12b, the e-mail server 13a, 13b, or the group-ware server 14a, 14b.

On the registration destination system side, there is provided a transfer destination system document transfer process section 205 for periodically confirming the transfer relay database 204 as to whether a document image is stored by the scan image transfer process module 203, and taking out the stored document image from the transfer relay database 204 and registering it on the database which is designated as a registration destination. Examples of the transfer destination database, on which the document image taken out of the transfer relay database 204 is to be registered, are an e-mail database 206, an accounting weekly report database 207 and a technical information database 208. The transfer destination system document transfer process section 205 refers to a transfer profile database 209 in which transfer specifications are defined, with respect to documents stored in the transfer relay database 204, and searches for the document image to be transferred as well as the designated transfer profile data. On the basis of the transfer profile data, the document is registered to some other database.

Prior to forming operation buttons which are displayed on the operation panel 1a, 1b of the digital copying machine 11a, 11b serving as the digital scanner according to the present invention, the user or application system manager prepares a transfer profile using a transfer profile setting section 210. The prepared transfer profile is stored in the transfer profile database 209. The transfer profile contains field map information to be described later, which defines how a read attribute of the document image and an operation button attribute are mapped in a document management system of the application system.

When the user forms operation buttons to be displayed on the operation panel 1a, 1b, he/she makes use of an operation button function setting section 211. In this case, a display location of an operation button, an icon used for display, a character sequence and a scanner read attribute are set, and a transfer profile identifier for transfer to the transfer destination application system is stored. The information in the transfer profile setting section 210 on the registration destination system and the information in the operation button function setting section 211 on the digital scanner side can be referred to by simple operations by means of, for example, a Web link (e.g. an anchor of HTML).

Figure 3:
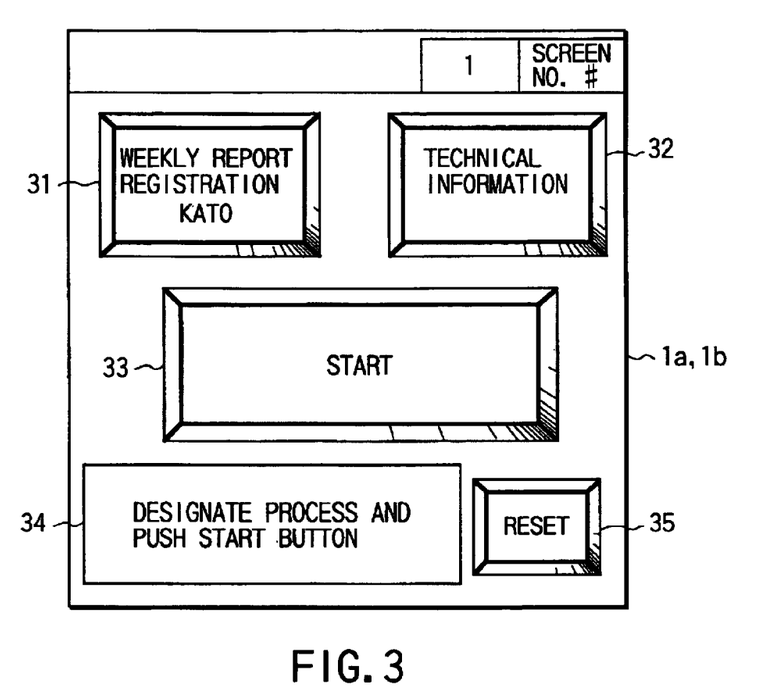
FIG. 3 shows an example of display on an operation panel.

FIG. 3 shows an example of display of operation buttons displayed on the operation panel 1a, 1b according to the present invention. In FIG. 3, the operation panel 1a, 1b displays a weekly registration "KATO" button 31, a technical information button 32, a start button 33, a reset button 35, and a guide display 34. The guide display 34, in this example, shows a message "DESIGNATE PROCESS AND PUSH START BUTTON."

In the displayed example, where a document image is to be scanned, the user first sets a document on the digital copying machine 11a or 11b, pushes the button 31 or 32, and depresses the start button 33. Then, the digital copying machine 11a, 11b scans the document image. The scanned document image is subjected to a process assigned to the selected button.

Figure 4:
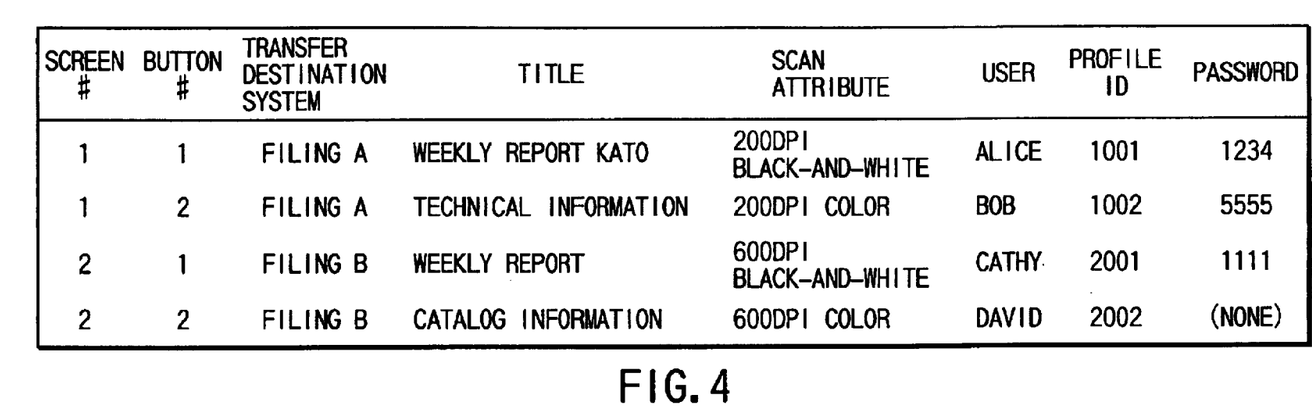
FIG. 4 shows an example of the structure of an operation button management database.

FIG. 4 shows an example of the structure of a database registered on the operation button management database 202.

In the display example in FIG. 4, a screen NO. #1 and a button No. #1 are selected and displayed. In the case of the screen NO. #1 and button No. #1, the transfer destination system is "FILING A," the title is "WEEKLY REPORT REGISTRATION KATO," the scanning is at "200DPI," the attribute is "BLACK-AND-WHITE," the user is "Alice," the profile is "1001," and the password is "1234."

A description will now be given of the data which is transferred from the scan image transfer process module 203 to the transfer relay database 204 in FIG. 2, when the buttons shown in FIG. 3 have been depressed and the start button 33 pushed.

Figure 5:
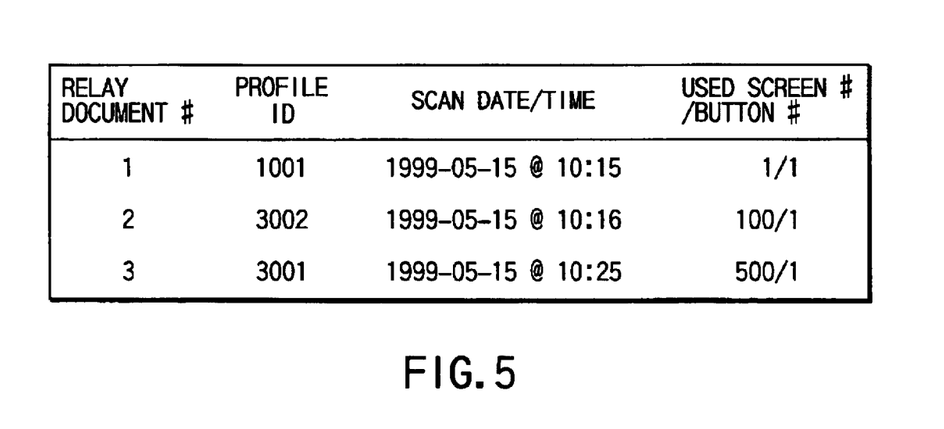
FIG. 5 shows an example of the structure of a transfer relay database.

FIG. 5 shows an example of the structure of the transfer relay database 204. Where the relay document No. is #1, the profile ID is "1001," the scan date/time is "1999-05-15 @ 10:15," and the used screen No. #/button No. are "1/1."

Figure 6:
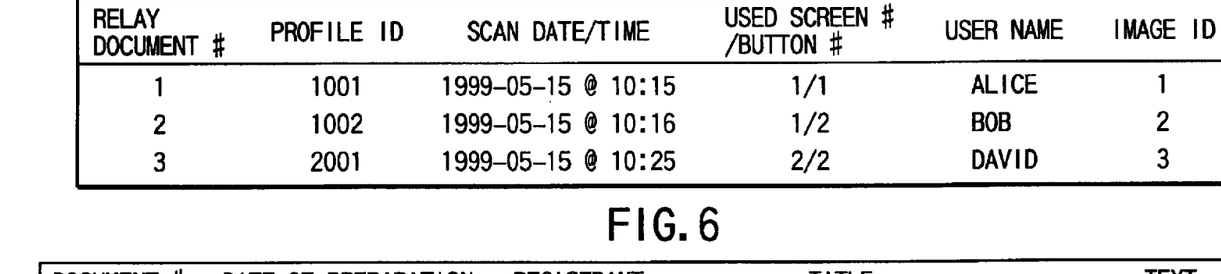
FIG. 6 shows an example of the structure of the transfer relay database.

FIG. 6 shows another example of the structure of the transfer relay database 204. Where the relay document No. is #1, the profile ID is "1001," the scan date/time is "1999-05-15 @ 10:15," and the used screen No. #/button No. are "1/1." In addition, the user name is "Alice," and the image ID is "1."

Subsequently, the data in the transfer relay database 204 is transferred by the transfer destination system document transfer process section 205 to the e-mail database 206, accounting weekly report database 207 or technical information database 208.

Figure 7:
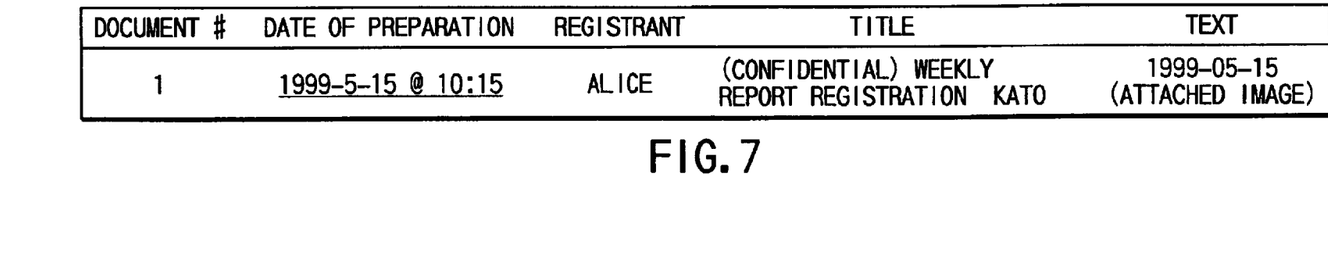
FIG. 7 shows an example of the structure of an accounting weekly report database.

FIG. 7 shows an example of the structure of the accounting weekly report database 207. Where the document No. is #1, the date of preparation is "1999-05-15 @ 10:15," the registrant is "Alice," the title is "(CONFIDENTIAL) WEEKLY REPORT REGISTRATION KATO," and the text is "ATTACHED IMAGE."

Figure 8:
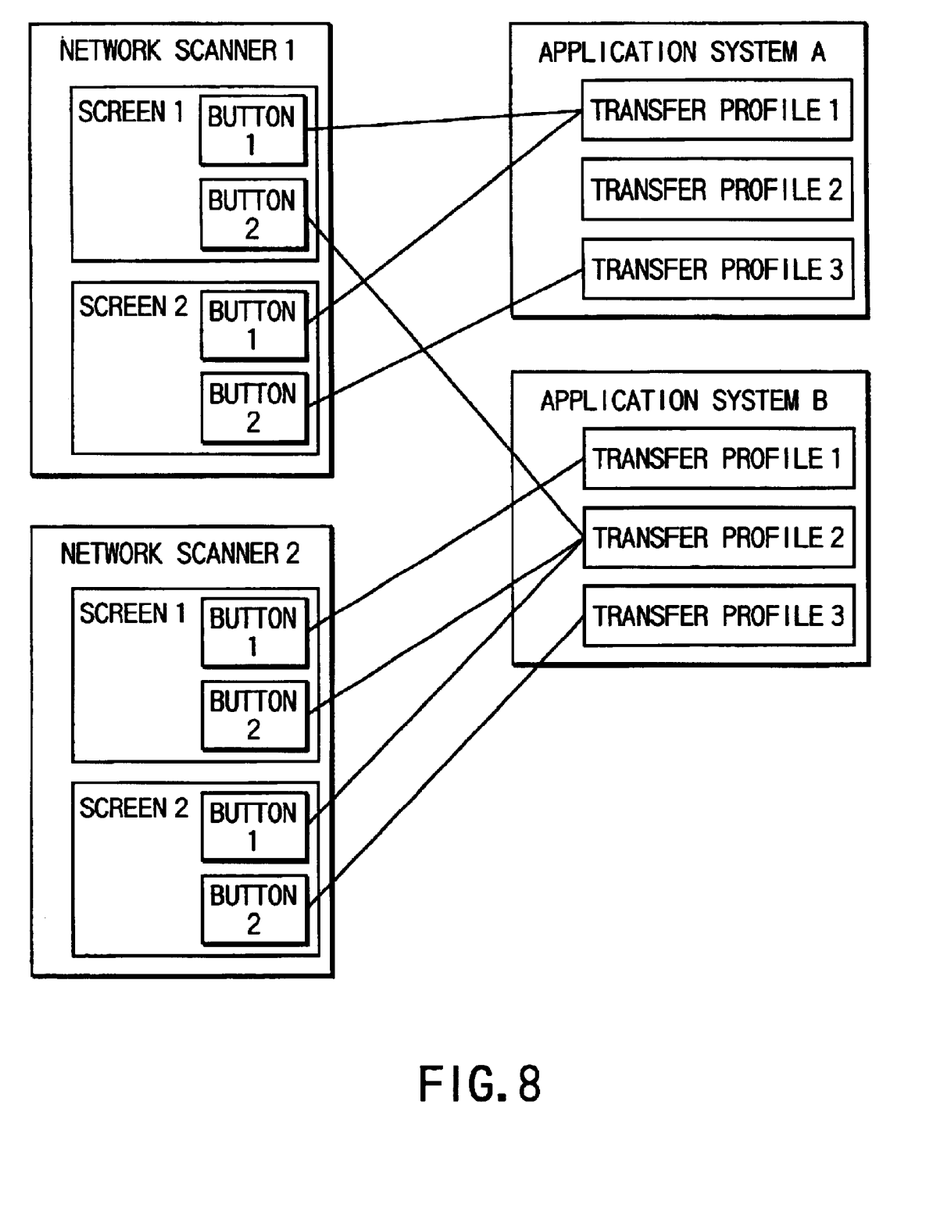
FIG. 8 shows a relationship between operation buttons on a network scanner and transfer profiles in each application station.

FIG. 8 shows a relationship between operation buttons on the network scanner and transfer profiles in each application station. Assume that the digital copying machine 11a is a network scanner 1, the digital copying machine 11b is a network scanner 2, an application system A is the group-ware server 14a, and an application system B is the group-ware server 14b. For example, where the screen No. on the network scanner 1 is "1," the button No. 1 corresponds to the transfer profile 1 of the application system A and the button No. 2 corresponds to the transfer profile 2 of the application system B.

A description will now be given of the transfer profile setting section 210 used by the transfer destination system document transfer process section 205 in FIG. 2.

Figure 9A:
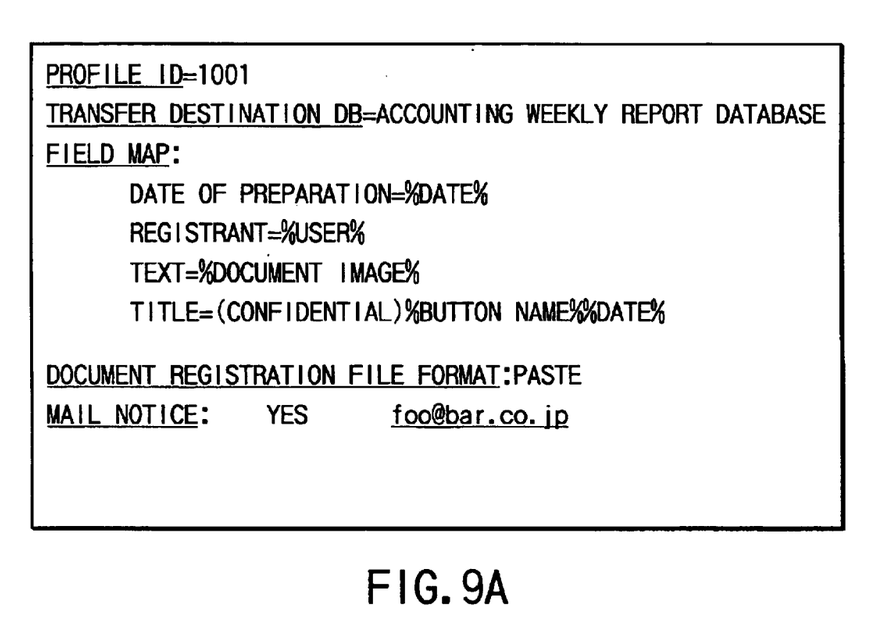
FIGS. 9A and 9B show examples of a field map of a transfer profile.

FIGS. 9A and 9B show examples of a field map of a transfer profile set in the transfer profile setting section 210. The settings in FIG. 9A are as follows: the profile ID=1001, the transfer destination database (DB)=the accounting weekly report database, the field map: the date of preparation=%DATE%, the registrant=%USER%, the text=%DOCUMENT IMAGE%, the title=(CONFIDENTIAL) %BUTTON NAME%%DATE%, the document registration file format: PASTE, the mail notice: YES foo@bar.co.jp.

Figure 9B:
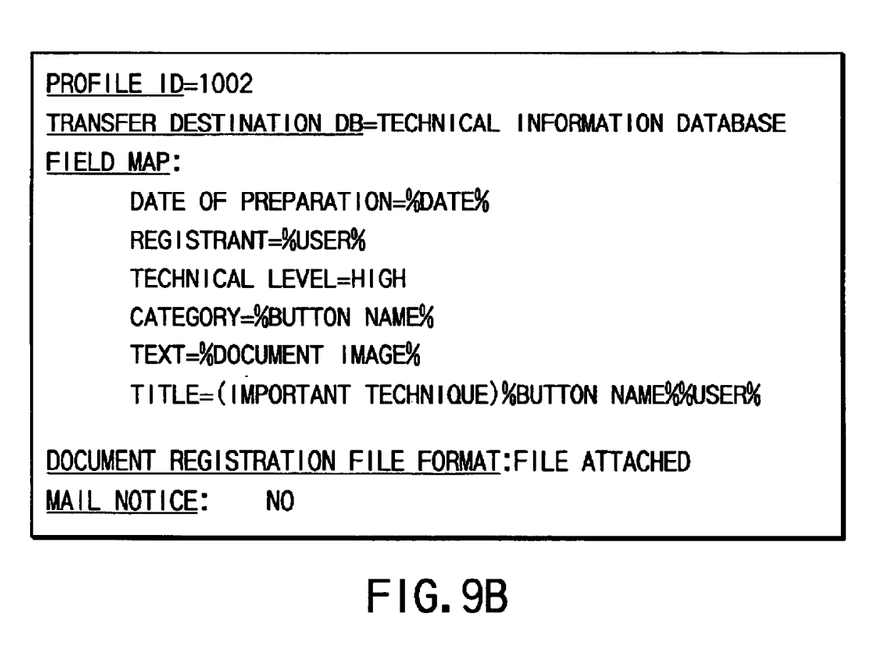

The settings in FIG. 9B are as follows: the profile ID=1002, the transfer destination database (DB)=the technical information database, the field map: the date of preparation=%DATE%, the registrant=%USER%, the technical level=HIGH, the category=%BUTTON NAME%, the text=%DOCUMENT IMAGE%, the title=(IMPORTANT TECHNIQUE) %BUTTON NAME%%USER%, the document registration file format: FILE ATTACHED, the mail notice: NO.

The use of an user ID in the transfer destination system will now be described.

In the present embodiment, one user ID is required for the digital scanner. In the prior art, it is difficult to issue a user ID for a shared device, where it is desired that security management is strictly maintained by issuing a user ID to an individual alone. In many cases, the sharing of a user ID among plural persons is prohibited. In the present embodiment, the user ID is used only for the scan input operation, and only one database can be accessed by the user ID. Only a predetermined database can be accessed.

To begin with, a transfer process pattern is set in the transfer destination system. At this time, the user who forms an operation button is required to have a right of access to the database which is designated as a transfer destination.

The process/operation at the time of scanning a document will now be described.

When a document image scanned by the digital copying machine 11a, 11b is to be temporarily stored in the transfer relay database 204, the data assigned to the device is used. The transfer destination system document transfer process section 205 moves, under the server authority, the document image temporarily stored in the transfer relay database 204. In order to detect storage of a new document image in the transfer relay database 204, the transfer destination system document transfer process section 205 performs polling at regular time intervals.

In an applied example, a server agent process request may be issued so that the scan image transfer process module 203 may activate, in an "on-demand" manner, the transfer destination system document transfer process section 205 immediately after the document image is stored in the transfer relay database 204.

Figure 10:
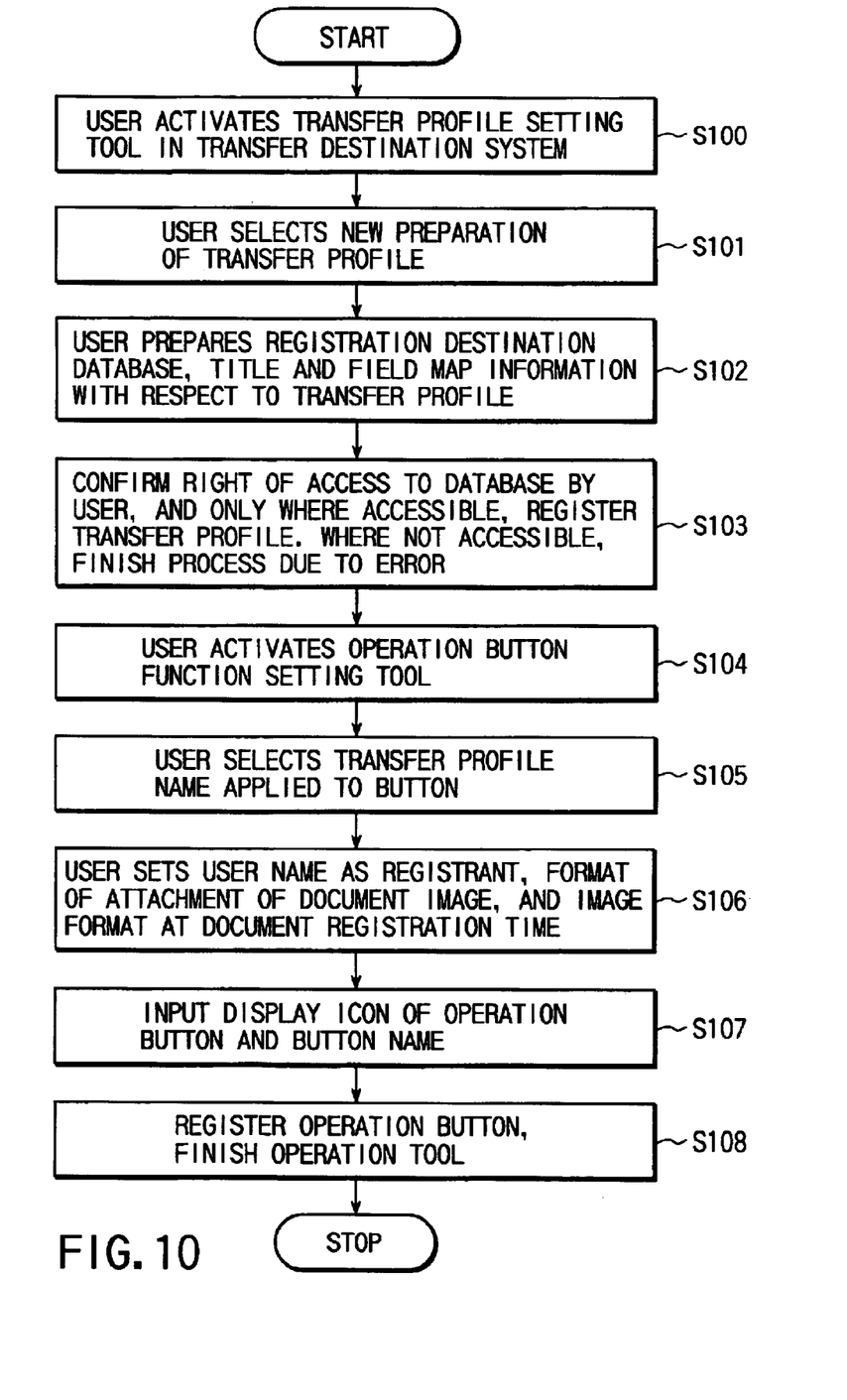
FIG. 10 is a flow chart for describing an operation for preparing an operation button.

An operation for forming the operation button to be displayed on the operation panel 1a, 1b on the digital copying machine 11a, 11b with the above-described structure will now be described with reference to a flow chart of FIG. 10.

To start with, the user activates the transfer profile setting tool in the transfer destination system (S100) and selects new preparation of a transfer profile (S101).

The user prepares a registration destination database, a title and field map information with respect to the transfer profile (S102). Thereby, the right of access to the database by the user is confirmed. Only where the database is accessible, the transfer profile is registered in the transfer profile setting section 210 (S103). Where the database is not accessible, the process is finished due to an error.

Then, the user activates the operation button function setting section 211 of the digital copying machine 11a, 11b (S104)# and selects a transfer profile name applied to the operation button (S105). Further, the user sets the user name as registrant, the format of attachment of the document image, and the image format at the time of document registration (S106), and inputs a display icon of the operation button and a button name (S107). The operation button is registered in the operation button management database 202 via the operation button management section 201, and the operation of the operation button function setting section 211 is finished (S108).

Figure 11A:
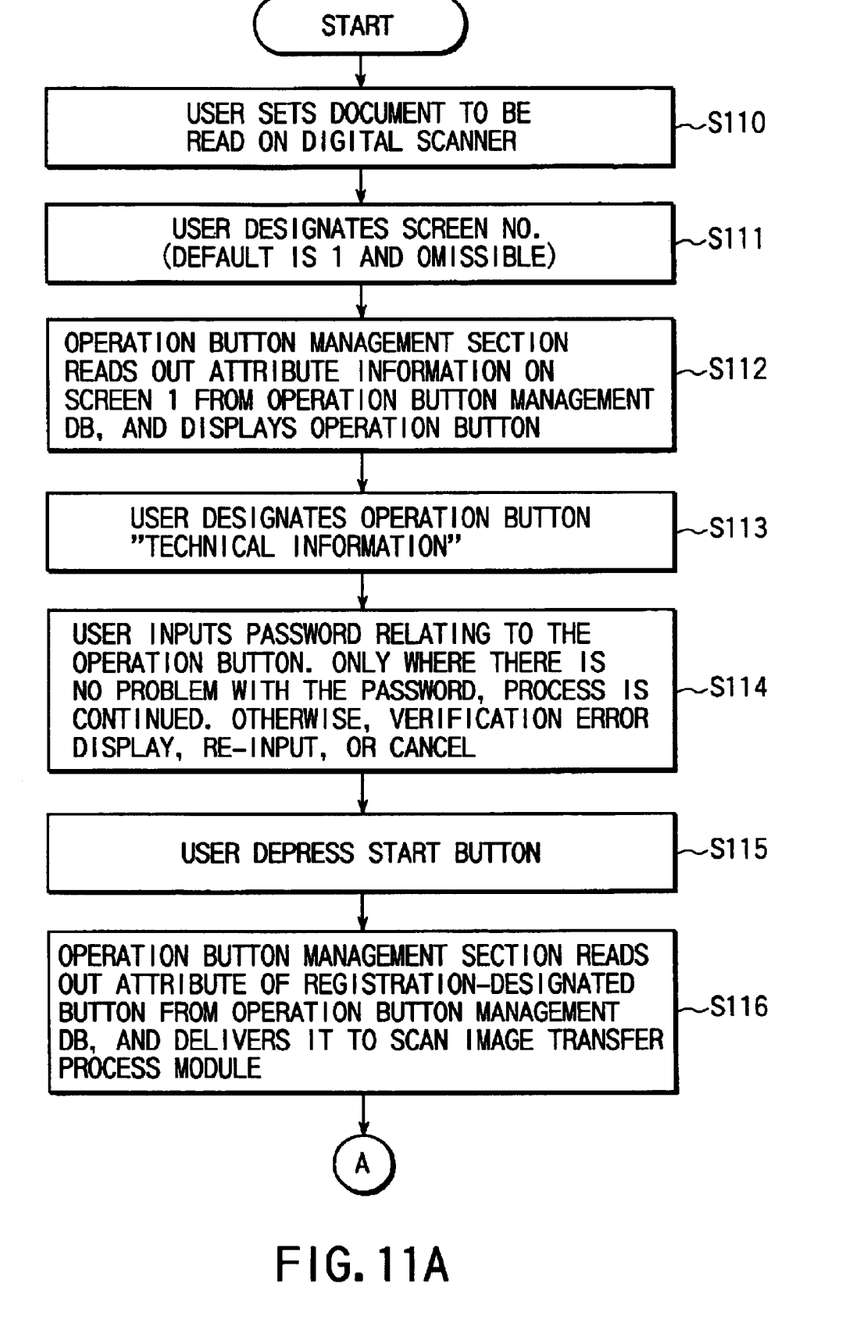
FIGS. 11A and 11B are flow charts for describing an operation at a time of document scan.
Figure 11B:
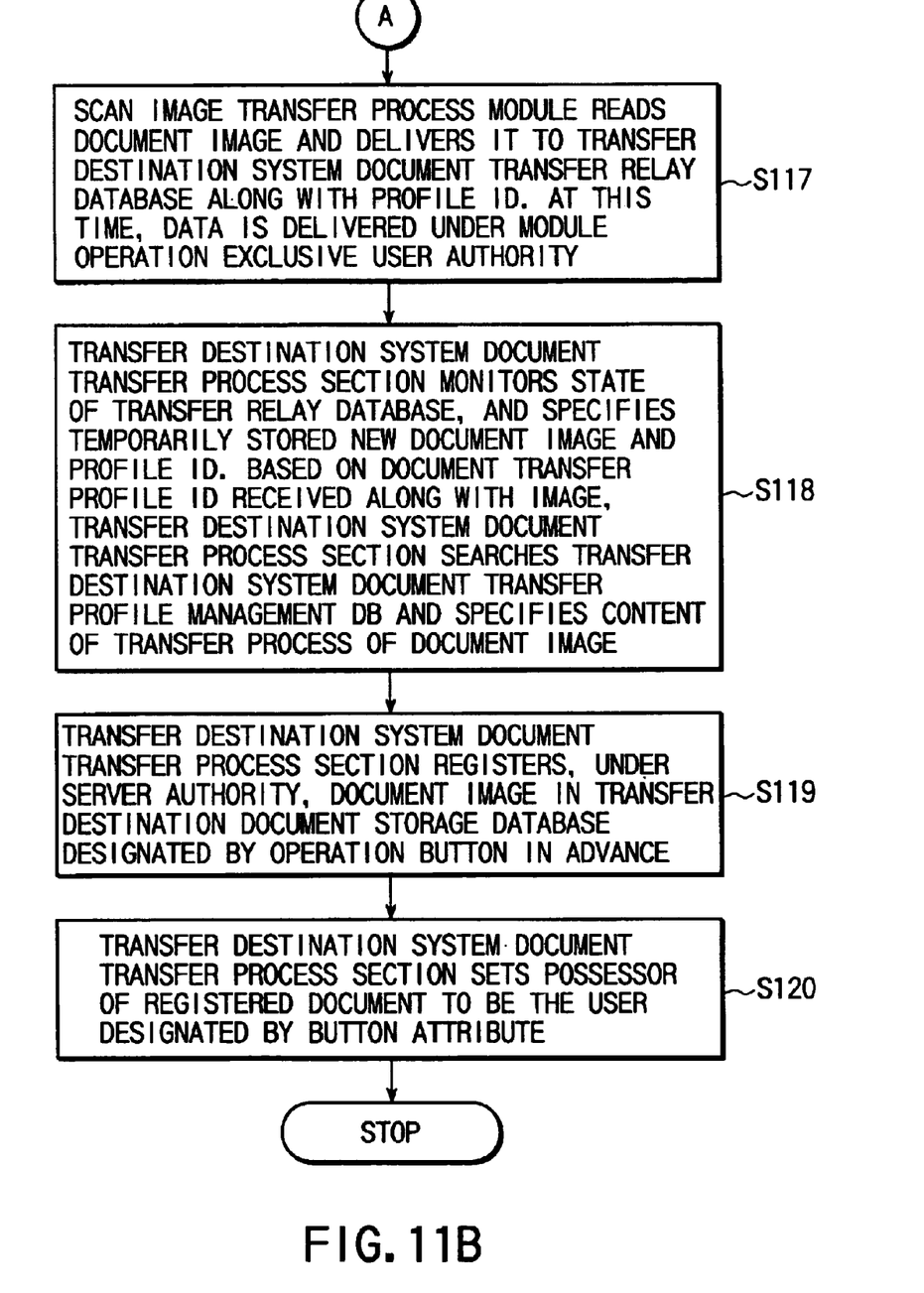

An operation at the time of document scan will now be described with reference to flow charts of FIGS. 11A and 11B.

The user sets a document 200 to be read on the digital copying machine 11a or 11b (S110) and designates the screen No. (S111). Assume that the screen 1 has been designated.

The operation button management section 201 of the digital copying machine 11a, 11b reads out attribute information on the screen 1 from the operation button management DB 202, and displays the operation button on the operation panel 1a, 1b (S112).

The user depresses and designates the technical information button 32 of the operation buttons (S113), and inputs the password relating to this operation button. Only where there is no problem with the verification of the password, the process is continued (S114). Otherwise, a process such as "VERIFICATION ERROR DISPLAY," "RE-INPUT," or "CANCEL" is carried out.

Where the process is continued, the start button 33 is depressed (S115). The operation button management section 201 reads out an attribute of the registration-designated button from the operation button management DB 202 and delivers it to the scan image transfer process module 203 (S116).

The scan image transfer process module 203 reads the document image and delivers it to the transfer relay database 204 of the transfer destination system document along with the profile ID (S117). At this time, the data is delivered under the module operation exclusive user authority.

The transfer destination system document transfer process section 205 monitors the state of the transfer relay database 204, and specifies the temporarily stored new document image and profile ID. Based on the document transfer profile ID received along with the image, the transfer destination system document transfer process section 205 searches the transfer profile database 209 of the transfer destination system document and specifies the content of the transfer process of the document image (S118).

The transfer destination system document transfer process section 205 registers, under the server authority, the document image in the transfer destination document storage database designated by the operation button in advance, for example, in the accounting weekly report database 207 (S119).

The transfer destination system document transfer process section 205 sets the possessor of the register document to be the user designated by the button attribute (S120).

A multi-destination-associated system will now be described.

Figure 12:
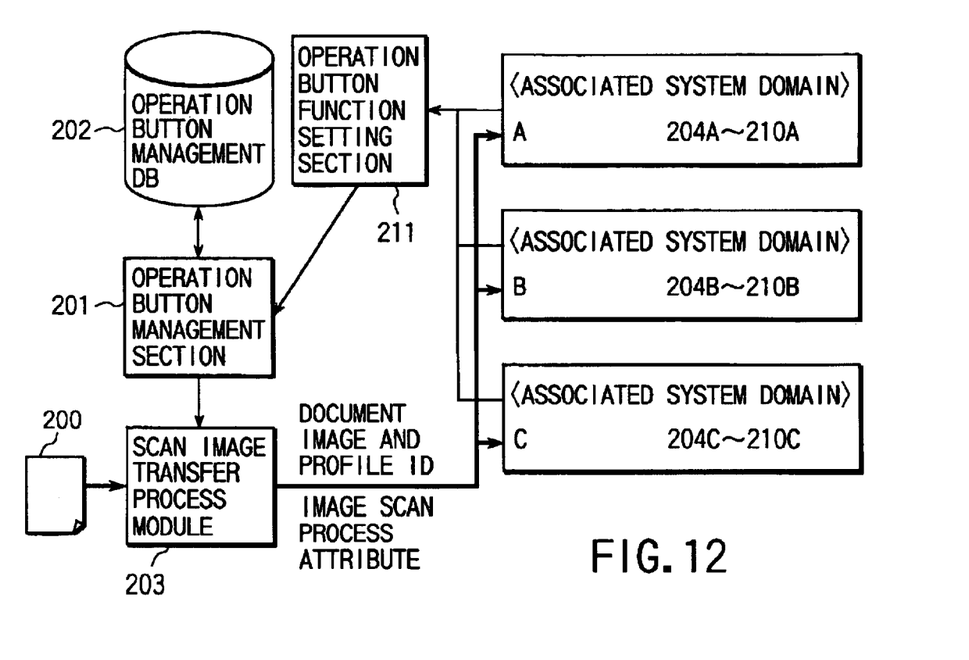
FIG. 12 shows a system module structure in a case of a multi-destination-associated system.

FIG. 12 shows a system module structure in a case of a multi-destination-associated system.

On the digital scanner side, like the structure shown in FIG. 2, the following components are provided: a document image 200 input by the digital copying machine 11a, 11b serving as a digital scanner; an operation button management section 201, provided in each digital copying machine 11a, 11b, for performing a display control of operation buttons displayed on the operation panel 1a, 1b of the digital copying machine 11a, 11b; an operation button management database (DB) 202, provided in each digital copying machine 11a, 11b, for managing display on the operation panel 1a, 1b; and a scan image transfer process module 203 for transferring the document image 200 to a transfer relay database 204 of a registration destination system, when the operator has depressed the buttons on the operation panel 1a, 1b and has input the document image 200.

Compared to the structure shown in FIG. 2, where the number of transfer destinations is increased, the document image, profile ID and image scan process attribute are transferred from the scan image transfer process module 203 to associated system domains A, B and C.

Although not shown, the associated system domain A includes a transfer relay database 204A, a transfer destination system document transfer process section 205A, an e-mail database 206A, an accounting weekly report database 207A, a technical information database 208A, a transfer profile database 209A, and a transfer profile setting section 210A.

The associated system domain B, though not shown, similarly includes components 204B to 210B.

Similarly, the associated system domain C, though not shown, includes components 204C to 210C.

Figure 13:
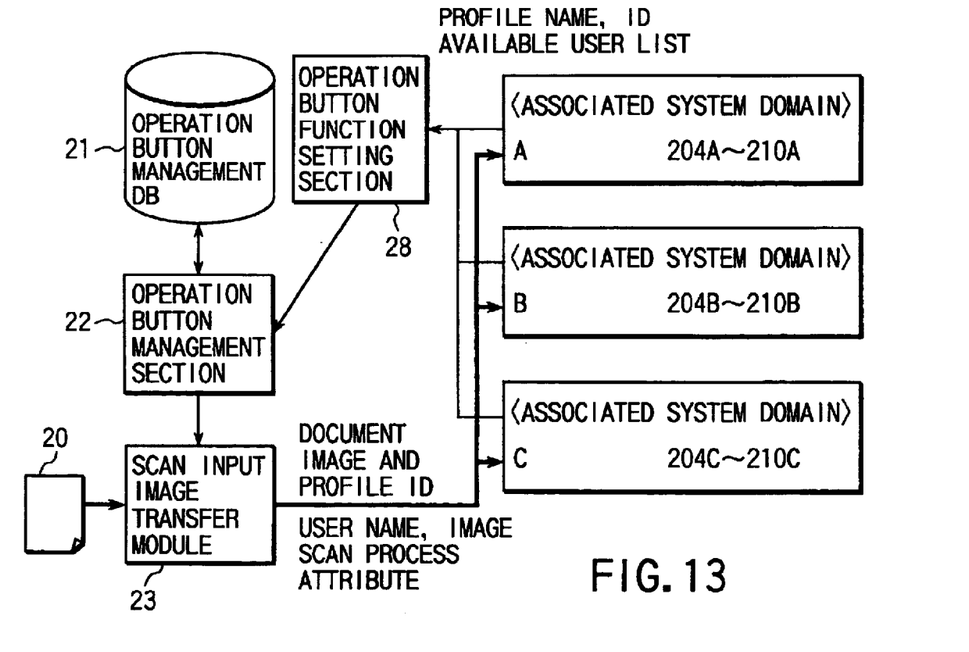
FIG. 13 shows a system module structure in a case of a multi-destination-associated system.

FIG. 13 shows a system module structure as an applied example of the multi-destination-associated system. This system comprises a document image 20, an operation button management section 22, an operation button management database (DB) 21, a scan input image transfer process module 23, and associated system domains A, B and C. The associated system domains A, B and C have the same structures as shown in FIG. 12, and so a description thereof is omitted, with like reference numerals being attached.

In FIG. 13, when a transfer profile is prepared in advance, a user name list for permitting use of the profile is stored along with the profile. When an operation button is formed, one of user names on the user name list is selected. When a document is to be registered, the scan input image transfer process module 23 stores the document image along with the user name in the transfer relay database 204. Using the user name as the registrant, the transfer destination system document transfer process section 205A, 205B, 205C provides the user with a right to edit the registered document. Thereby, even if the user does not directly log in to the application system when the network scanner is used, the specified user (registrant) can be given the right to edit the document.

Figure 14A:
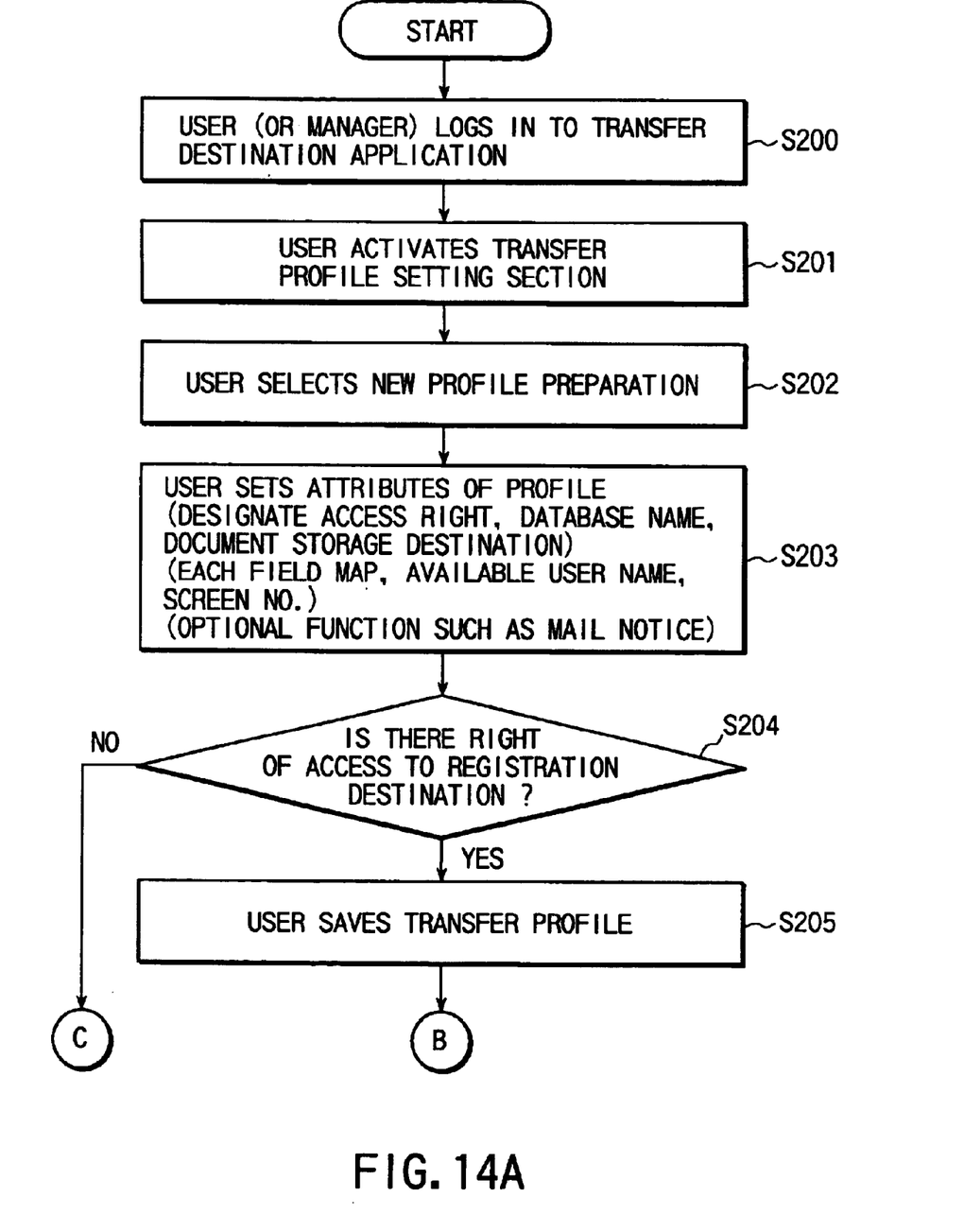
FIGS. 14A and 14B are flow charts for describing an operation for preparing an operation button.
Figure 14B:
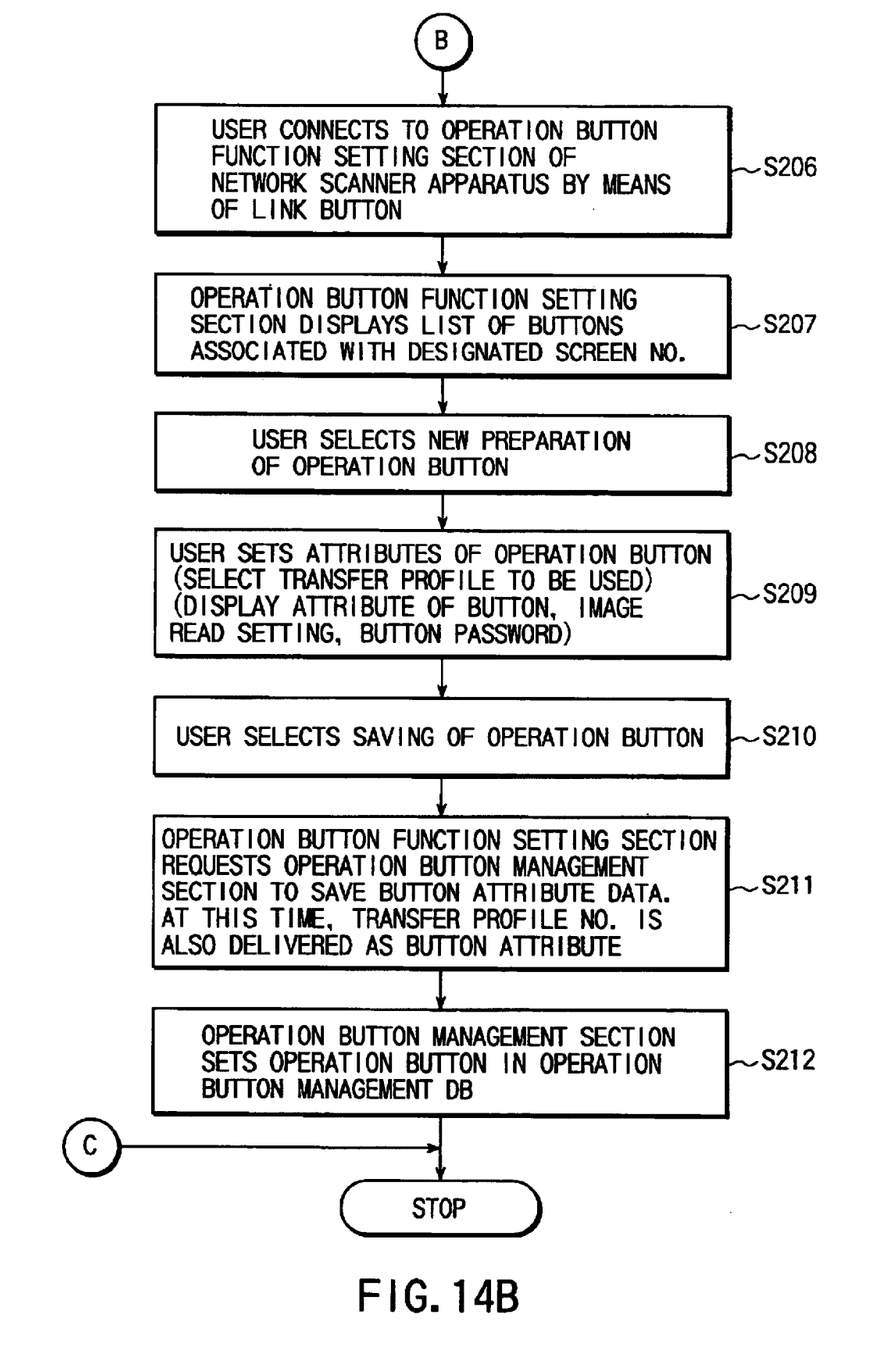

A process for forming the operation button in the above-described structure will now be described with reference to flow charts of FIGS. 14A and 14B.

To start with, the user (or manager) logs in to the transfer destination application (S200), activates the transfer profile setting section 210 (S201), and selects new profile preparation (S202).

The user then sets attributes of the profile (S203). For example, the user designates the access right, database name, and document storage destination, and sets each field map, available user name, screen No., an optional function such as mail notice.

It is determined whether there is a right of access to the registration destination (S204). Where there is no access right, the process is stopped.

Where there is the access right in step S204, the user saves the transfer profile (S205).

The user connects to the operation button function setting section 211 of the digital copying machine 11a, 11b serving as the network scanner by means of the link button (S206). The operation button function setting section 211 displays a list of buttons associated with the designated screen No. (S207).

The user selects new preparation of the operation button (S208), and sets attributes of the operation button (S209). For example, the user selects the transfer profile to be used, and sets the display attribute of the button, image read setting, and button password. The user selects saving of the operation button (S210).

The operation button function setting section 211 requests the operation button management section 201 to save the button attribute data (S211). At this time, the transfer profile No. is also delivered as the button attribute.

The operation button management section 201 sets the operation button in the operation button management DB 202 (S212).

As has been described above, according to the embodiment of the present invention, where the document image read by the digital scanner is transmitted and transferred to a plurality of application systems, the transfer registration profile is prepared within the transfer destination system and the profile number can be assigned to the operation button of the digital scanner (the transfer registration profile contains a mapping table of the document image attributes of the document image read by depressing the image read button on the digital scanner and the document attribute information necessary for managing the document image in the transfer destination system).

At the time of scan, the document image and the associated profile number are temporarily stored in the transfer relay database of the transfer destination system under the scanner exclusive user authority. Thus, the scanner exclusive user can access the transfer relay database alone in the transfer destination system. If the image is temporarily stored in the relay database, the second program which is run by the server authority detects the storage of the image and refers to the content of the associated profile. According to the content, the transfer process is completed under the server authority.

The right to edit the document can be given to the person who prepared the profile (the user name is not assigned to the button. Whoever inputs the document, the person who prepared the profile assigned to the button used at that time is given the right to edit the document.)

Further, the transfer registration profile stores the user list for restricting the use of the profile. Where the operation button of the digital copying machine and the profile are assigned, one of users on the user list is selected, and the user ID is delivered along with the document image which is to be input/transferred and registered. Thus, at the time of the transfer and registration, the user is given the right to edit the document (only the person who input the document can edit the document).

When the transfer registration profile is prepared in the transfer destination system, the right of access to the transfer registration destination database by the person who is to prepare the profile is confirmed. Only where he/she has the right of access, the preparation of the profile is permitted.

When the transfer registration profile is prepared in the transfer destination system, the operation button to which the profile can be assigned is designated. When the function is assigned to the operation button of the digital scanner, only the profile which is available by the button is associated and also the password is assigned to the button.

When the transfer registration profile is prepared in the transfer destination system, the operation panel screen to which the profile can be assigned is designated. When the function is assigned to the operation button of the digital scanner, only the profile which is available on the screen including the button is associated. In addition, the password is assigned to the screen.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information process system according in which an image forming apparatus having display input means capable of displaying various operation buttons and effecting input is connected to a communication line and information is processed with a server connected to the communication line, wherein the server has formation means for forming operation button information which sets a function to be performed by the image forming apparatus and is to be displayed on the display input means, and information for verifying a right of use of an operation button represented by the operation button information and the image forming apparatus comprises:

registration means for registering the operation button information which sets the function to be performed by the image forming apparatus and has been formed by the formation means, and the information for verifying the right of use of the operation button, which has been formed by the formation means;

control means for executing a control to display the operation button on the display input means, on the basis of the operation button information which sets the function to be performed by the image forming apparatus and has been registered by the registration means;

verification means for verifying the presence or absence of the right of use by using the information for verifying the right of use of the operation button, which has been registered by the registration means, when input has been effected through the operation button displayed on the display input means by the control means; and execution means for executing a desired function set by the operation button through which input has been effected, when the presence of the right of use has been verified by the verification means, wherein said server includes:

first storage means for temporarily storing image information transferred from the image forming apparatus and transfer identification information;

second storage means for storing transfer process information corresponding to the transfer identification information of the image information transferred to the first storage means; and process means for finding the transfer process information stored in the second storage means by using the transfer identification information stored in the first storage means, and processing transfer of the image information stored in the first storage means on the basis of the found transfer process information.

2. An information process method in which an image forming apparatus having display input means capable of displaying various operation buttons and effecting input is connected to a communication line and information is processed with a server connected to the communication line, wherein the server forms operation button information which sets a function to be performed by the image forming apparatus and is to be displayed on the display input means, and information for verifying a right of use of an operation button represented by the operation button information and the image forming apparatus registers the operation button information which sets the function to be performed by the image forming apparatus and has been formed by the server, and the information for verifying the right of use of the operation button, which has been formed by the server; executes a control by way of a control means to display the operation button on the display input means, on the basis of the registered operation button information which sets the function; verifies the presence or absence of the right of use by using the registered information for verifying the right of use of the operation button, when input has been effected through the operation button displayed on the display input means by the control means; and executes a desired function set by the operation button when the presence of the right of use has been verified, wherein said server temporarily stores image information transferred from the image forming apparatus and transfer identification information; stores transfer process information corresponding to the transfer identification information; and finds the stored transfer process information by using the temporarily stored transfer identification information, and processes transfer of the temporarily stored image information on the basis of the found transfer process information.

3. An information process system in which an image forming apparatus has a display input unit capable of displaying various operation buttons and effecting input is connected to a communication line and information is processed with a server connected to the communication line, wherein the server is configured to form operation button information which sets a function to be performed by the image forming apparatus and is to be displayed on the display input unit, and information for verifying a right of use of an operation button represented by the operation button information and the image forming apparatus comprises:

a registration unit configured to register the operation button information which sets the function to be performed by the image forming apparatus and has been formed by the server, and the information for verifying the right of use of the operation button, which has been formed by the server;

a controller configured to execute a control to display the operation button on the display input unit, on the basis of the operation button information which sets the function to be performed by the image forming apparatus and has been registered by the registration unit;

a verification unit configured to verify the presence or absence of the right of use by using the information for verifying the right of use of the operation button, which has been registered by the registration unit, when input has been effected through the operation button displayed on the display input unit by the controller; and an execution unit configured to execute a desired function set by the operation button through which input has been effected, when the presence of the right of use has been verified by the verification unit, wherein said server includes:

a first storage configured to temporarily store image information transferred from the image forming apparatus and transfer identification information;

a second storage configured to store transfer process information corresponding to the transfer identification information of the image information transferred to the first storage; and a processor configured to find the transfer process information stored in the second storage by using the transfer identification information stored in the first storage, and to process transfer of the image information stored in the first storage on the basis of the found transfer process information.

4. An information process method in which an image forming apparatus has a display input unit capable of displaying various operation buttons and effecting input is connected to a communication line and information is processed with a server connected to the communication line, wherein the server forms operation button information which sets a function to be performed by the image forming apparatus and is to be displayed on the display input unit, and information for verifying a right of use of an operation button represented by the operation button information and the image forming apparatus registers the operation button information which sets the function to be performed by the image forming apparatus and has been formed by the server, and the information for verifying the right of use of the operation button, which has been formed by the server; executes a control by way of a controller to display the operation button on the display input unit, on the basis of the registered operation button information which sets the function; verifies the presence or absence of the right of use by using the registered information for verifying the right of use of the operation button, when input has been effected through the operation button displayed on the display input unit by the controller; and executes a desired function set by the operation button when the presence of the right of use has been verified, wherein said server temporarily stores image information transferred from the image forming apparatus and transfer identification information; stores transfer process information corresponding to the transfer identification information; and finds the stored transfer process information by using the temporarily stored transfer identification information, and processes transfer of the temporarily stored image information on the basis of the found transfer process information.

* * * * *